US012107373B2

(12) United States Patent
Takagi

(10) Patent No.: US 12,107,373 B2
(45) Date of Patent: Oct. 1, 2024

(54) ASSEMBLY INCLUDING A CABLE AND A CONNECTOR WITH SECOND COUPLING PORTION OF EACH DC CONTACT OF CONNECTOR COUPLED WITH FIRST COUPLING PORTIONS OF AT LEAST TWO DC WIRES OF CABLE

(71) Applicant: Japan Aviation Electronics Industry, Limited, Tokyo (JP)

(72) Inventor: Youhei Takagi, Irvine, CA (US)

(73) Assignee: Japan Aviation Electronics Industry, Limited, Tokyo (JP)

( * ) Notice: Subject to any disclaimer, the term of this patent is extended or adjusted under 35 U.S.C. 154(b) by 359 days.

(21) Appl. No.: 17/589,992

(22) Filed: Feb. 1, 2022

(65) Prior Publication Data

US 2023/0020874 A1 Jan. 19, 2023

Related U.S. Application Data

(60) Provisional application No. 63/222,017, filed on Jul. 15, 2021.

(51) Int. Cl.
*H01R 13/502* (2006.01)
*H01R 4/06* (2006.01)
(Continued)

(52) U.S. Cl.
CPC ............... *H01R 4/06* (2013.01); *H01R 13/11* (2013.01); *H01R 13/502* (2013.01);
(Continued)

(58) Field of Classification Search
CPC ........ H01R 4/06; H01R 13/11; H01R 13/502; H01R 13/5208; H01R 13/521; H01R 27/02; H01R 13/111; H01R 2201/26
See application file for complete search history.

(56) References Cited

U.S. PATENT DOCUMENTS 8,430,696 B2 4/2013 Matsumoto et al.
9,620,897 B2 4/2017 Takagi
(Continued)

FOREIGN PATENT DOCUMENTS

JP 5044508 B 10/2012
JP 2017-027824 A 2/2017
(Continued)

*Primary Examiner* — Abdullah A Riyami
*Assistant Examiner* — Nelson R. Burgos-Guntin
(74) *Attorney, Agent, or Firm* — Collard & Roe, P.C.

(57) ABSTRACT

An assembly comprises a cable and a connector. The cable includes at least four direct current (DC) wires. Each of the DC wires has a first coupling portion at an end thereof. The connector is attached to the cable. The connector comprises a housing and two DC contacts. The housing has two accommodating portions. The two DC contacts are arranged in a horizontal direction. The DC contacts are accommodated in the accommodating portions, respectively. Each of the DC contacts has a contact portion and a second coupling portion. The second coupling portion of each of the DC contacts is connected with the first coupling portions of at least two of the DC wires in the corresponding accommodating portion. The first coupling portions, which are connected with the second coupling portion, are arranged in parallel in the horizontal direction.

6 Claims, 9 Drawing Sheets

(51) Int. Cl.
*H01R 13/11* (2006.01)
*H01R 13/52* (2006.01)
*H01R 27/02* (2006.01)

(52) U.S. Cl.
CPC ....... *H01R 13/5208* (2013.01); *H01R 13/521* (2013.01); *H01R 27/02* (2013.01)

(56) References Cited

U.S. PATENT DOCUMENTS

| | | | | |
|---|---|---|---|---|
| 2019/0135131 | A1* | 5/2019 | Wenz | H01R 4/308 |
| 2019/0202302 | A1* | 7/2019 | Turik | B60L 53/18 |
| 2019/0217731 | A1* | 7/2019 | Rönfanz | H01R 31/06 |
| 2020/0307400 | A1* | 10/2020 | de Chazal | B60L 53/16 |
| 2020/0317070 | A1 | 10/2020 | Fuhrer | |
| 2020/0350099 | A1 | 11/2020 | Nakai et al. | |
| 2020/0384875 | A1* | 12/2020 | Rhodes | B60L 53/11 |
| 2021/0006010 | A1* | 1/2021 | Schreiber | B60L 53/16 |
| 2021/0021077 | A1* | 1/2021 | Mathews | H01R 13/5202 |
| 2021/0063097 | A1* | 3/2021 | Hitchcock | B60L 53/16 |
| 2021/0086632 | A1* | 3/2021 | Dupont | B60L 53/16 |
| 2021/0323421 | A1* | 10/2021 | Janarthanam | B60L 53/16 |
| 2021/0347270 | A1* | 11/2021 | Cole | B60L 53/16 |

FOREIGN PATENT DOCUMENTS

| | | |
|---|---|---|
| JP | 2019-519073 A | 7/2019 |
| JP | 2019-129007 A | 8/2019 |

* cited by examiner

ASSEMBLY INCLUDING A CABLE AND A CONNECTOR WITH SECOND COUPLING PORTION OF EACH DC CONTACT OF CONNECTOR COUPLED WITH FIRST COUPLING PORTIONS OF AT LEAST TWO DC WIRES OF CABLE

CROSS REFERENCE TO RELATED APPLICATIONS

This application is a non-provisional application that hereby claims priority under 35 U.S.C. 119(e) from U.S. Provisional Patent Application Ser. No. 63/222,017 filed on Jul. 15, 2021, the disclosure of which is incorporated herein by reference.

BACKGROUND OF THE INVENTION

This invention relates to an assembly comprising a cable and a connector which is attached to the cable.

As shown in FIG. 18, Patent Document 1 discloses an assembly 900 comprising a cable 950 and a connector 910 which is attached to the cable 950. The cable 950 includes two direct current (DC) wires 952. The connector 910 comprises a housing 912 and two DC contacts 914. The DC wires 952 are connected with the DC contacts 914, respectively.

[Patent Document 1] JP-A 2017-27824

In the assembly 900 of Patent Document 1, heat generation in the DC wires 952 becomes large when large current flows through the DC wires 952. In order to reduce heat generation in the DC wires 952 when large current flows through the DC wires 952, each of the DC wires 952 must have an increased cross-section. However, the DC wire 952 having an increased cross-section is expensive and difficult to handle.

SUMMARY OF THE INVENTION

It is therefore an object of the present invention to provide an assembly comprising a novel configuration that can handle large current.

One aspect of the present invention provides an assembly comprising a cable and a connector. The cable includes at least four DC wires. Each of the DC wires has a first coupling portion at an end thereof. The connector is attached to the cable. The connector is mateable with a mating connector which has mating contacts. The connector comprises a housing and two DC contacts. The housing has two accommodating portions. The two DC contacts are arranged in a horizontal direction.

The DC contacts are accommodated in the accommodating portions, respectively. Each of the DC contacts has a contact portion and a second coupling portion. The contact portion is positioned forward of the second coupling portion in a front-rear direction perpendicular to the horizontal direction. When the connector and the mating connector are mated with each other, the contact portions of the DC contacts are brought into contact with the mating contacts, respectively. The second coupling portion of each of the DC contacts is connected with the first coupling portions of at least two of the DC wires in the corresponding accommodating portion. The first coupling portions, which are connected with the second coupling portion, are arranged in parallel in the horizontal direction.

The assembly of the present invention is configured so that the second coupling portion of each of the DC contacts is connected with the first coupling portions of at least two of the DC wires in the corresponding accommodating portion. Specifically, the assembly of the present invention is configured so that two or more of the DC wires are connected to the single DC contact so that less current flows through each of the DC wires. This reduces heat generation in each of the DC wires.

Additionally, the assembly of the present invention is configured so that the first coupling portions of the DC wires, which are connected with the second coupling portion of the DC contact, are arranged in parallel in the horizontal direction. Specifically, a connection portion connecting the DC contact with the DC wires tends to generate more heat than the other part thereof when large current flows through the DC wires, and the first coupling portions included in the connection portion are arranged in parallel in the horizontal direction. This reduces transfer of heat from one of the first coupling portions to another of the first coupling portions in comparison with an assumption where the first coupling portions be arranged in an up-down direction perpendicular to the horizontal direction. Thus, the assembly of the present invention is configured so that temperature rises at the first coupling portions are reduced when large current flows through the DC wires.

An appreciation of the objectives of the present invention and a more complete understanding of its structure may be had by studying the following description of the preferred embodiment and by referring to the accompanying drawings.

Figure 1:
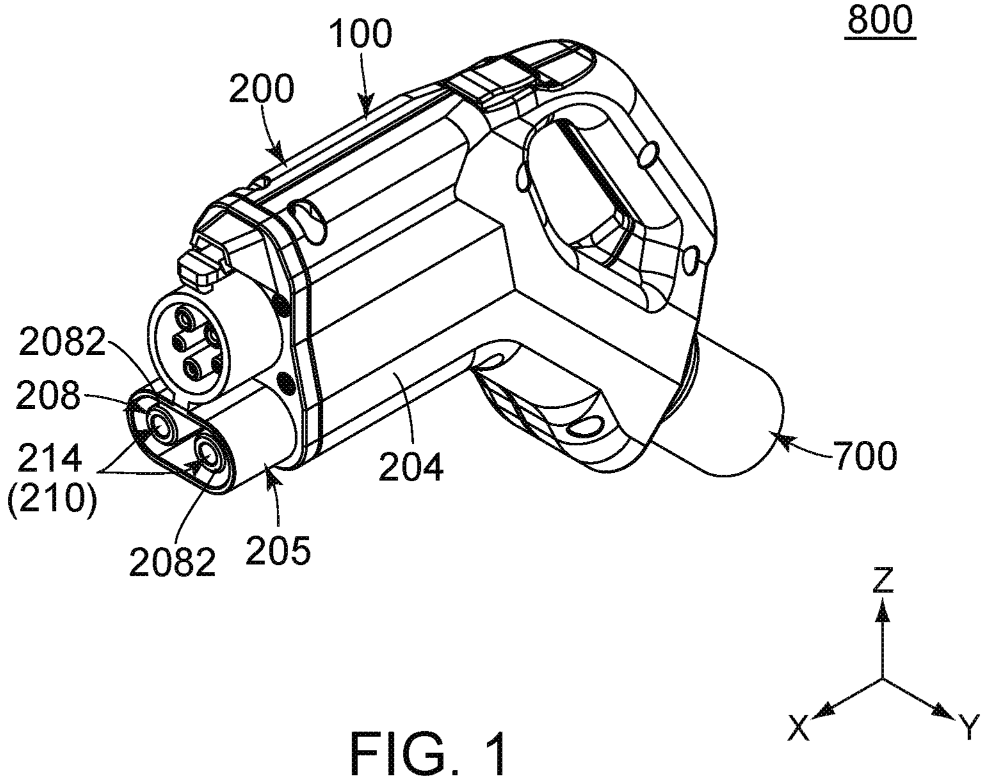
FIG. 1 is a front, perspective view showing an assembly according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 5:
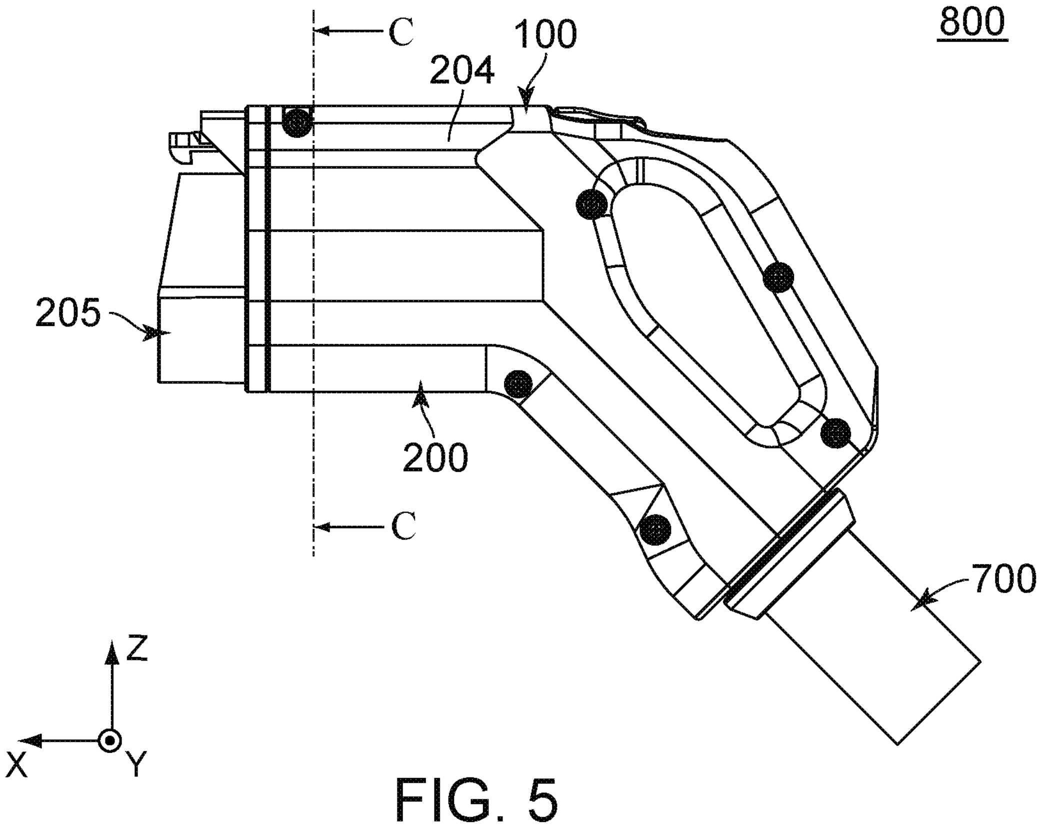
FIG. 5 is a side view showing the assembly of FIG. 1.

As shown in FIG. 5, an assembly 800 according to an embodiment of the present invention comprises a cable 700 and a connector 100.

Figure 4:
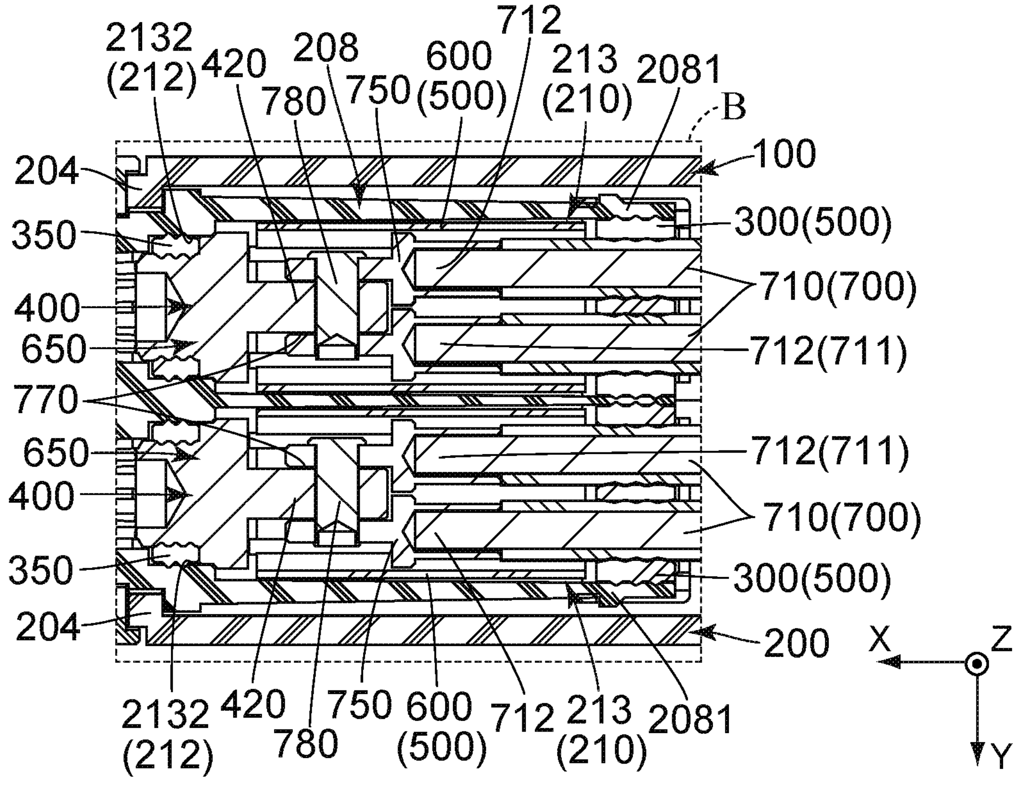
FIG. 4 is an enlarged, cross-sectional view showing a part which is enclosed by dotted line B of FIG. 3.

As shown in FIG. 4, the cable 700 of the present embodiment includes four direct current (DC) wires 710. However, the present invention is not limited thereto, but the cable 700 should include at least four DC wires 710. The DC wires 710 have the same configuration as each other. Each of the DC wires 710 has a core wire 711. An end of the core wire 711 functions as a first coupling portion 712. In other words, each of the DC wires 710 has the first coupling portion 712 at the end thereof. The first coupling portion 712 is positioned at a front end of the DC wire 710 in a front-rear direction. In the present embodiment, the front-rear direction is an X-direction. Specifically, forward is a positive X-direction while rearward is a negative X-direction.

As shown in FIG. 4, the assembly 800 of the present embodiment further comprises four terminals 750.

Figure 17:
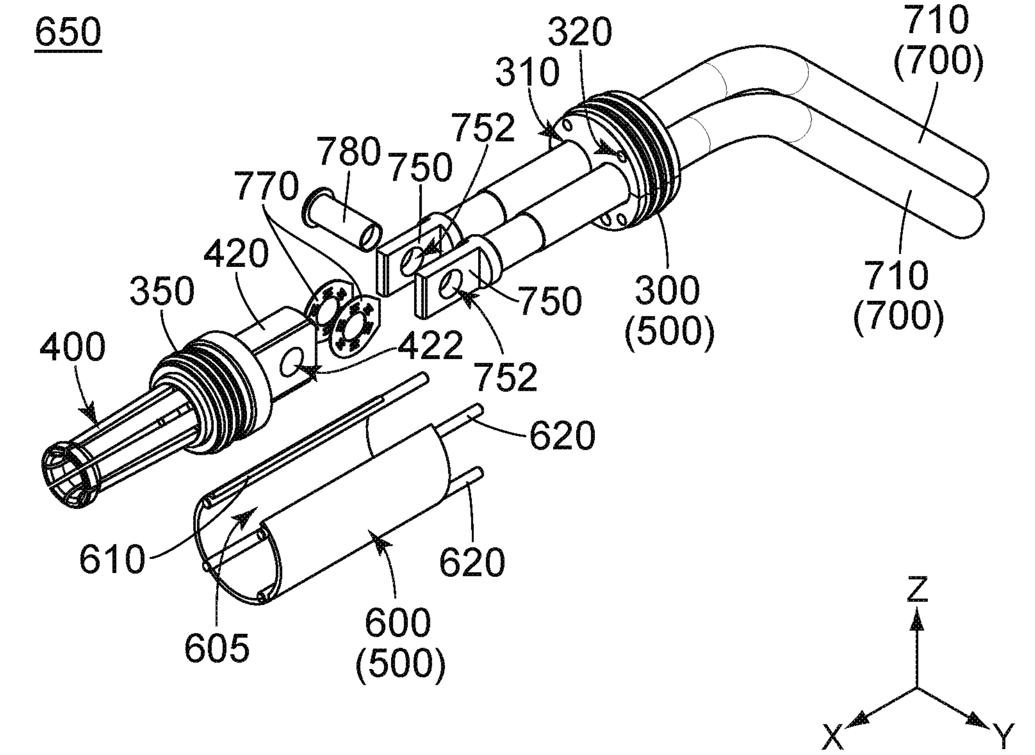
FIG. 17 is another exploded, perspective view showing the assembly element of FIG. 15. In the figure, the sleeve is detached from the connector element. In addition, a rivet is detached from a DC contact and the second coupling portion is not connected with any of the first coupling portions.
Figure 18:
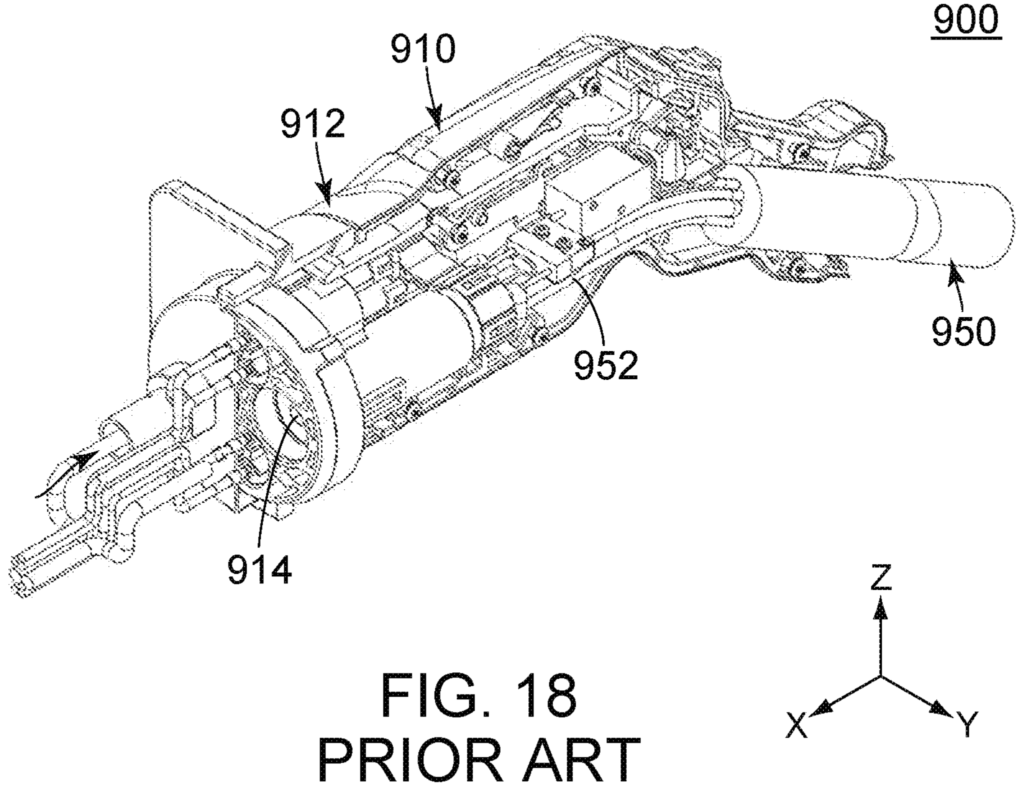
FIG. 18 PRIOR ART
FIG. 18 is a perspective view showing an assembly of Patent Document 1. In the figure, a part of an outer shell is removed from a connector.

Referring to FIG. 4, each of the terminals 750 is made of metal. The terminals 750 are connected with the first coupling portions 712 of the DC wires 710, respectively. As shown in FIG. 17, each of the terminals 750 has a first hole 752. The first hole 752 pierces the terminal 750 in a horizontal direction. In the present embodiment, the horizontal direction is a Y-direction. In addition, the horizontal direction is also referred to as a right-left direction. Specifically, it is assumed that rightward is a positive Y-direction while leftward is a negative Y-direction.

As shown in FIG. 5, the connector 100 of the present embodiment is attached to the cable 700. The connector 100 is mateable with a mating connector (not shown) which has mating contacts (not shown). More specifically, the connector 100 is mateable from behind along the front-rear direction with the mating connector which is positioned forward of the connector 100. The mating contact of the mating connector is a so-called male contact.

Figure 3:
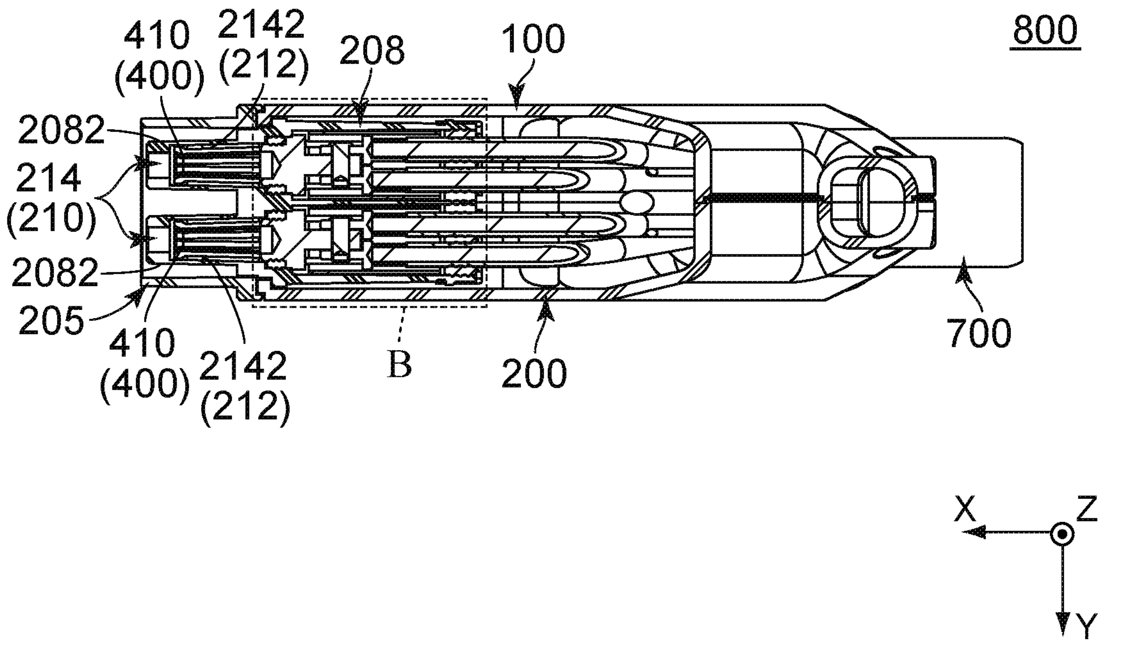
FIG. 3 is a cross-sectional view showing the assembly of FIG. 2, taken along line A-A.

As shown in FIG. 3, the connector 100 comprises a housing 200 and two DC contacts 400.

Figure 10:
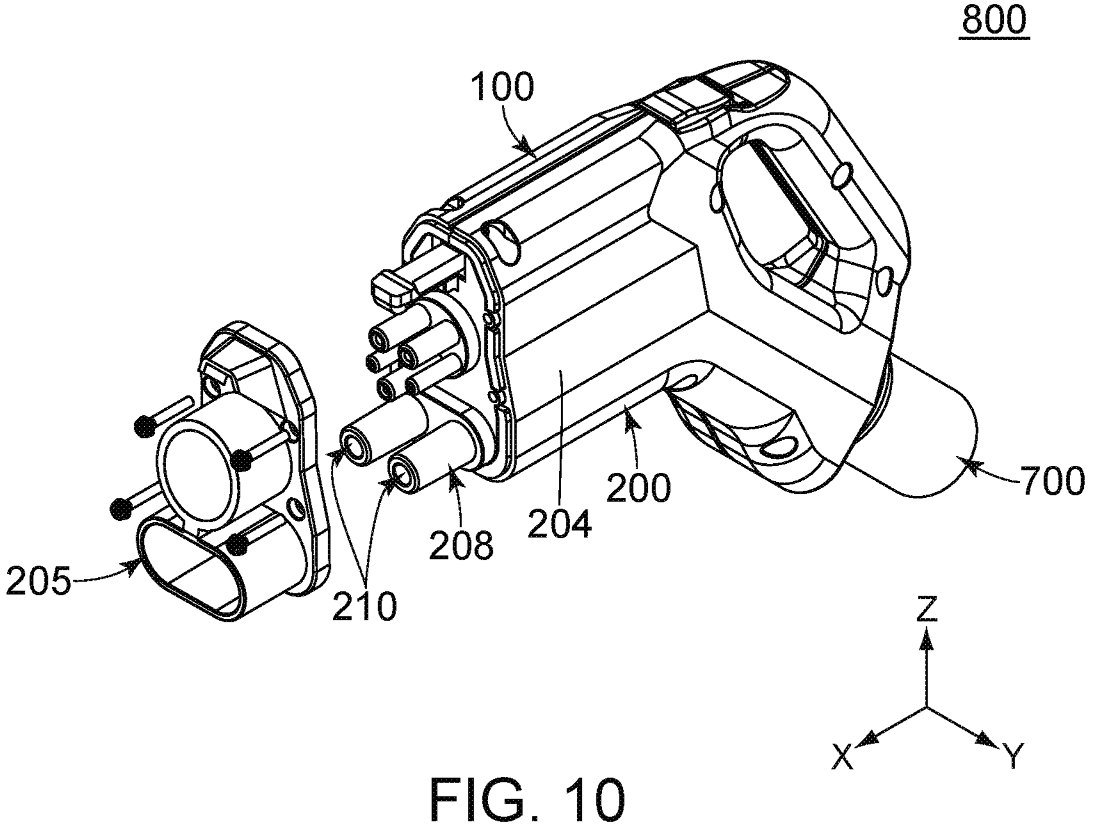
FIG. 10 is a front, perspective view showing the assembly of FIG. 1. In the figure, a mating portion is separated from the connector.

Referring to FIG. 10, the housing 200 of the present embodiment is made of resin. The housing 200 has two covers 204, a mating portion 205 and a housing main 208.

Referring to FIG. 10, the covers 204 of the present embodiment are attached to opposite sides, respectively, of the connector 100 in the horizontal direction.

As shown in FIG. 1, the mating portion 205 of the present embodiment defines a front end of the housing 200 in the front-rear direction. The mating portion 205 is recovered in a mating portion receiving portion of the mating connector when the connector 100 is mated with the mating connector.

As shown in FIG. 4, the housing main 208 has two accommodating portions 210. In other words, the housing 200 has the two accommodating portions 210.

Figure 13:
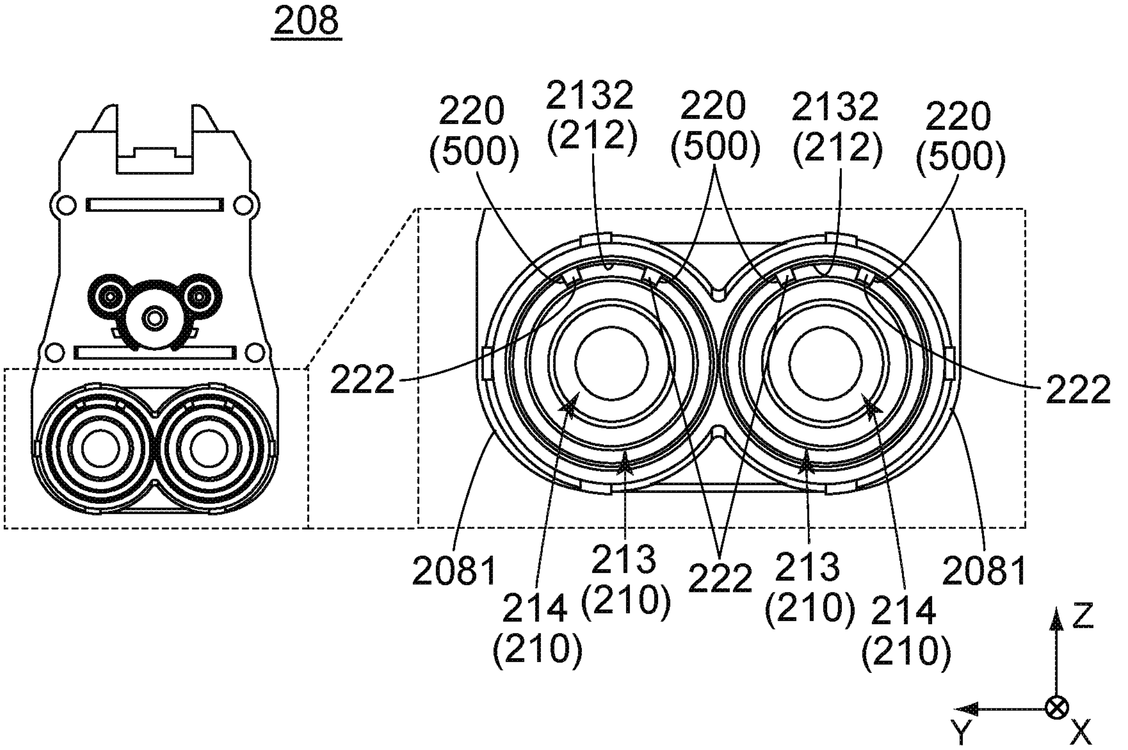
FIG. 13 is a rear view showing the housing main of FIG. 11. In the figure, a part of the housing main is illustrated enlarged.

As shown in FIG. 13, each of the accommodating portions 210 of the present embodiment is a hole whose cross-section perpendicular to the front-rear direction is circular. Each of the accommodating portions 210 pierces the housing main 208 in the front-rear direction. As shown in FIGS. 3 and 4, each of the accommodating portions 210 has an inner wall 212. The inner wall 212 defines an outer end of the accommodating portion 210 in a direction perpendicular to the front-rear direction.

Figure 11:
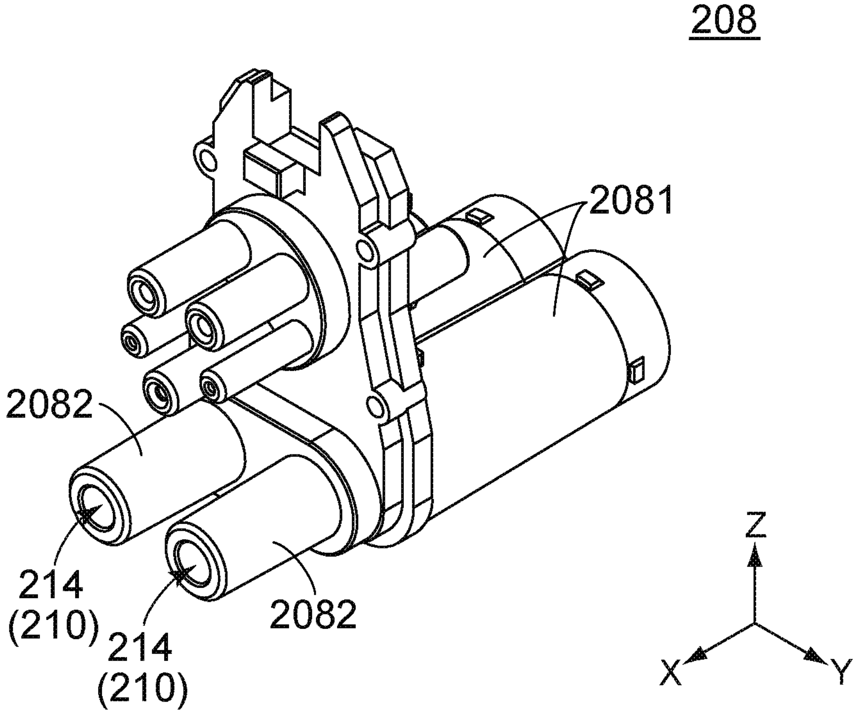
FIG. 11 is a front, perspective view showing the housing main which is included in the assembly of FIG. 10.

As shown in FIG. 11, the housing main 208 of the present embodiment has two first tube portions 2081 and two second tube portions 2082.

Figure 14:
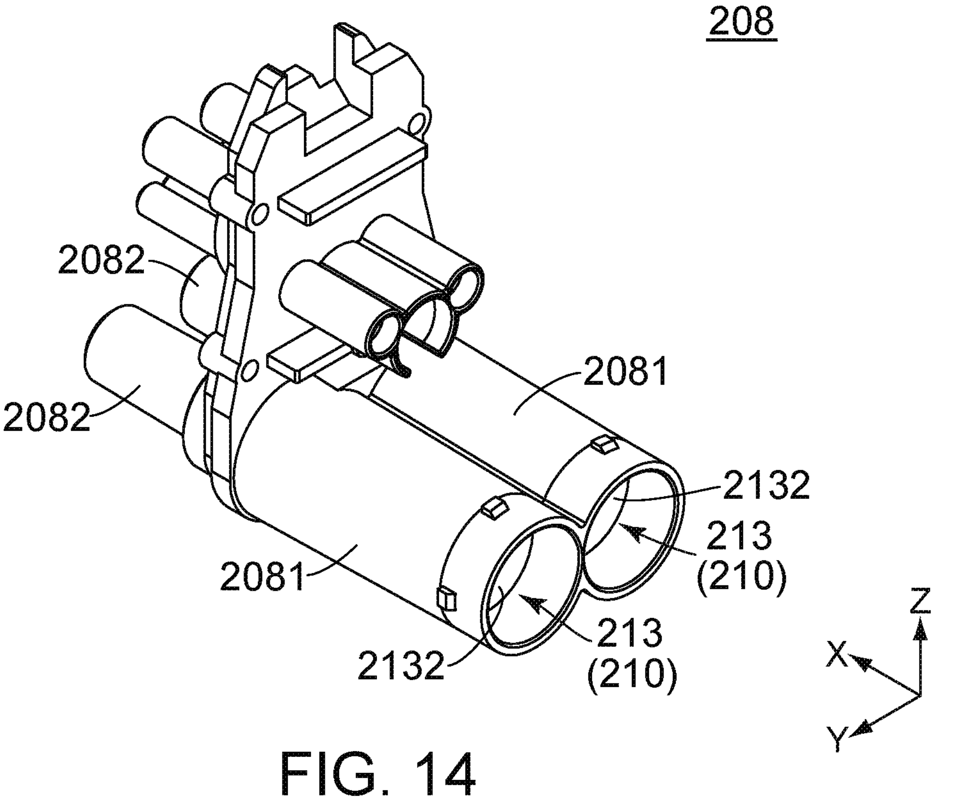
FIG. 14 is a rear, perspective view showing the housing main of FIG. 11.

As shown in FIGS. 13 and 14, each of the first tube portions 2081 of the present embodiment has a substantially cylindrical shape extending in the front-rear direction. The first tube portion 2081 is positioned rearward in the front-rear direction beyond the second tube portion 2082. The first tube portion 2081 defines a rear end of the housing main 208 in the front-rear direction. The two first tube portions 2081 do not communicate with each other in the horizontal direction. Each of the first tube portions 2081 has a first accommodating portion 213.

As shown in FIG. 13, the first accommodating portion 213 of the present embodiment is a hole whose cross-section perpendicular to the front-rear direction is circular. The first accommodating portion 213 has a first inner wall 2132. The first inner wall 2132 defines an outer end of the first accommodating portion 213 in the direction perpendicular to the front-rear direction. As shown in FIG. 4, the first coupling portion 712 is accommodated in the first accommodating portion 213. In other words, the first coupling portion 712 is accommodated in the accommodating portion 210. The terminal 750 is accommodated in the first accommodating portion 213. In other words, the terminal 750 is accommodated in the accommodating portion 210.

As shown in FIG. 13, the first tube portions 2081 of the present embodiment have regulating portions 220, respectively. In other words, the housing 200 has two of the regulating portions 220.

As shown in FIG. 13, the regulating portion 220 of the present embodiment is positioned around an upper end of the first accommodating portion 213. The regulating portion 220 protrudes in the first accommodating portion 213. In other words, the regulating portions 220 protrude in the accommodating portions 210, respectively. The regulating portion 220 consists of two protruding portions 222. Each of the protruding portions 222 extends downward in an up-down direction. Each of the protruding portions 222 extends in a direction oblique to both the up-down direction and the horizontal direction. Each of the protruding portions 222 protrudes downward in the up-down direction from an upper part of the first inner wall 2132 of the first accommodating portion 213. In other words, each of the protruding portions 222 protrudes downward in the up-down direction from an upper part of the inner wall 212 of the accommodating portion 210. In the present embodiment, the up-down direction is a Z-direction. Specifically, upward is a positive Z-direction while downward is a negative Z-direction.

Figure 2:
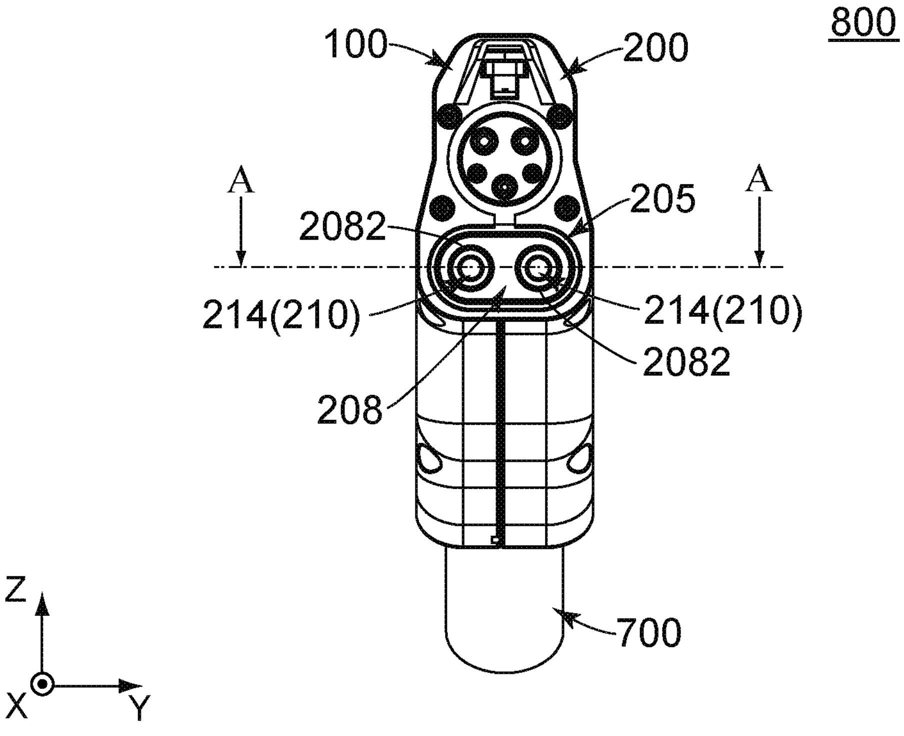
FIG. 2 is a front view showing the assembly of FIG. 1.
Figure 12:
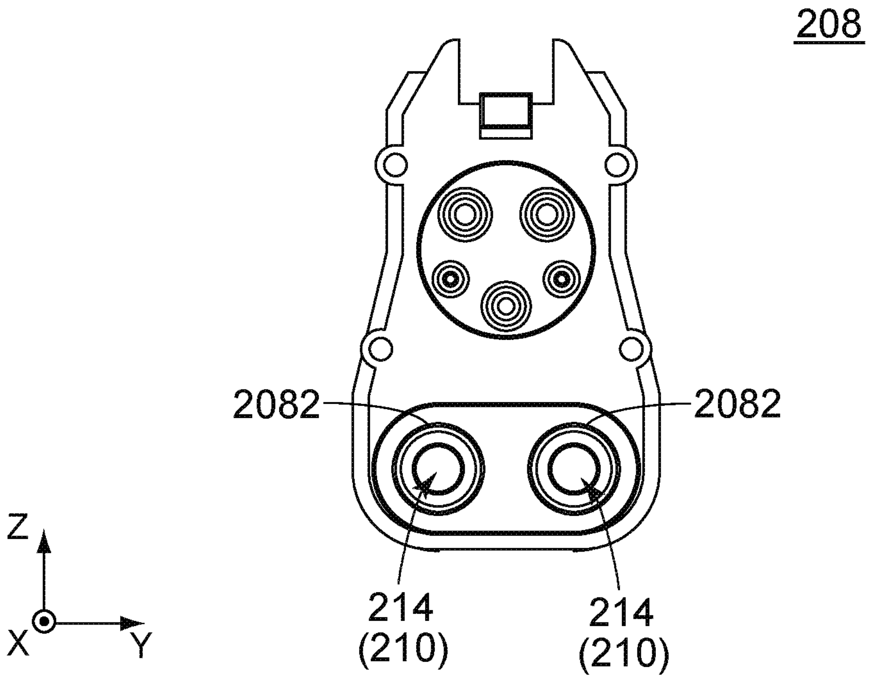
FIG. 12 is a front view showing the housing main of FIG. 11.

As shown in FIGS. 11 and 12, each of the second tube portions 2082 of the present embodiment has a substantially cylindrical shape extending in the front-rear direction. The second tube portion 2082 is positioned forward in the front-rear direction beyond the first tube portion 2081. The second tube portion 2082 defines a front end of the housing main 208 in the front-rear direction. The two second tube portions 2082 are positioned away from each other in the horizontal direction. As shown in FIG. 2, each of the second tube portions 2082 is surrounded by the mating portion 205 in the direction perpendicular to the front-rear direction. As shown in FIG. 3, in the front-rear direction, a front end of the second tube portion 2082 is positioned rearward beyond a front end of the mating portion 205. Each of the second tube portions 2082 has a second accommodating portion 214. The accommodating portion 210 includes the first accommodating portion 213 and the second accommodating portion 214.

As shown in FIG. 13, the second accommodating portion 214 of the present embodiment is a hole whose cross-section perpendicular to the front-rear direction is circular. Referring to FIGS. 3 and 4, the second accommodating portion 214 is positioned forward in the front-rear direction beyond the first accommodating portion 213. The second accommodating portion 214 has a second inner wall 2142. The second inner wall 2142 defines an outer end of the second accommodating portion 214 in the direction perpendicular to the front-rear direction. The inner wall 212 includes the first inner wall 2132 and the second inner wall 2142.

Referring to FIG. 17, each of the DC contacts 400 of the present embodiment is made of metal. The DC contact 400 is a so-called female contact. As shown in FIGS. 3 and 4, the two DC contacts 400 are arranged in the horizontal direction. The DC contacts 400 are accommodated in the accommodating portions 210, respectively. Each of the DC contacts 400 has a contact portion 410 and a second coupling portion 420.

Referring to FIGS. 3 and 4, the contact portion 410 of the present embodiment is positioned forward of the second coupling portion 420 in the front-rear direction perpendicular to the horizontal direction. The contact portions 410 of the DC contacts 400 are brought into contact with the mating contacts, respectively, when the connector 100 and the mating connector are mated with each other. The contact portion 410 is positioned around a front end of the DC contact 400 in the front-rear direction. The contact portion 410 is accommodated in the second accommodating portion 214.

As shown in FIG. 17, the second coupling portion 420 of the present embodiment defines a rear end of the DC contact 400 in the front-rear direction. A size of the second coupling portion 420 in the up-down direction is greater than a size of the second coupling portion 420 in the horizontal direction. The second coupling portion 420 has a second hole 422. The second hole 422 pierces the second coupling portion 420 in the horizontal direction. As shown in FIG. 4, the second coupling portion 420 is accommodated in the first accommodating portion 213. In other words, the second coupling portion 420 is accommodated in the accommodating portion 210.

As shown in FIG. 4, the second coupling portion 420 of each of the DC contacts 400 is connected with the first coupling portions 712 of two of the DC wires 710. Accordingly, the two DC wires 710 are connected to the single DC contact 400 so that less current flows through each of the DC wires 710. Thus, the assembly 800 of the present embodiment is configured so that heat generation in each of the DC wires 710 is reduced.

However, the present invention is not limited thereto, but the second coupling portion 420 of each of the DC contacts 400 may be connected with the first coupling portions 712 of three or more of the DC wires 710. In other words, the second coupling portion 420 of each of the DC contacts 400 should be connected with the first coupling portions 712 of at least two of the DC wires 710 in the corresponding accommodating portion 210. Accordingly, two or more of the DC wires 710 are connected to the single DC contact 400 so that less current flows through each of the DC wires 710. This further reduces heat generation in each of the DC wires 710.

Referring to FIG. 4, the first coupling portions 712, which are connected with the second coupling portion 420, are positioned at positions same as each other in the up-down direction. The first coupling portions 712, which are connected with the second coupling portion 420, are positioned at positions same as each other in the front-rear direction. The first coupling portions 712, which are connected with the second coupling portion 420, are arranged in parallel in the horizontal direction.

As described above, the first coupling portions 712, which are connected with the second coupling portion 420, are arranged in parallel in the horizontal direction. This reduces transfer of heat from one of the first coupling portions 712 to a remaining one of the first coupling portions 712 in comparison with an assumption where the first coupling portions 712 be arranged in the up-down direction perpendicular to the horizontal direction. Thus, the assembly 800 of the present embodiment is configured so that temperature rises at the first coupling portions 712 are reduced when large current flows through the DC wires 710.

As shown in FIG. 4, each of the second coupling portions 420 is interposed by two of the terminals 750 in the horizontal direction. The two terminals 750, which interpose the second coupling portion 420, are positioned at positions same as each other in the up-down direction. The two terminals 750, which interpose the second coupling portion 420, are positioned at positions same as each other in the front-rear direction.

As shown in FIG. 4, the assembly 800 of the present embodiment further comprises two holding members 300 and two sleeves 600.

Referring to FIG. 17, the holding member 300 of the present embodiment is made of insulator such as rubber having elasticity. Each of the holding members 300 has two piercing holes 310 and four holding holes 320. The two DC wires 710 are inserted into the two piercing holes 310, respectively, of the holding member 300. In other words, the holding member 300 holds the DC wires 710. The holding members 300 function as rear waterproofing members 300, respectively. As shown in FIG. 4, the rear waterproofing member 300 is positioned in the accommodating portion 210. The rear waterproofing member 300 is positioned in the first accommodating portion 213. More specifically, the rear waterproofing member 300 is positioned at a rear end of the first accommodating portion 213 in the front-rear direction. Referring to FIGS. 3 and 4, the rear waterproofing member 300 is positioned rearward of the second accommodating portion 214 in the front-rear direction. The rear waterproofing member 300 is positioned rearward of the contact portion 410 in the front-rear direction. The rear waterproofing member 300 is positioned rearward of the second coupling portion 420 in the front-rear direction. The rear waterproofing member 300 is positioned rearward of the terminal 750 in the front-rear direction. The rear waterproofing member 300 is positioned rearward of the first coupling portion 712 in the front-rear direction. The rear waterproofing members 300 correspond to the DC contacts 400 and the accommodating portions 210, respectively. Each of the rear waterproofing members 300 seals between the DC wire 710 and the inner wall 212 of the corresponding accommodating portion 210. More specifically, each of the rear waterproofing members 300 seals between the DC wire 710 and the first inner wall 2132 of the first accommodating portion 213 of the corresponding accommodating portion 210.

Figure 16:
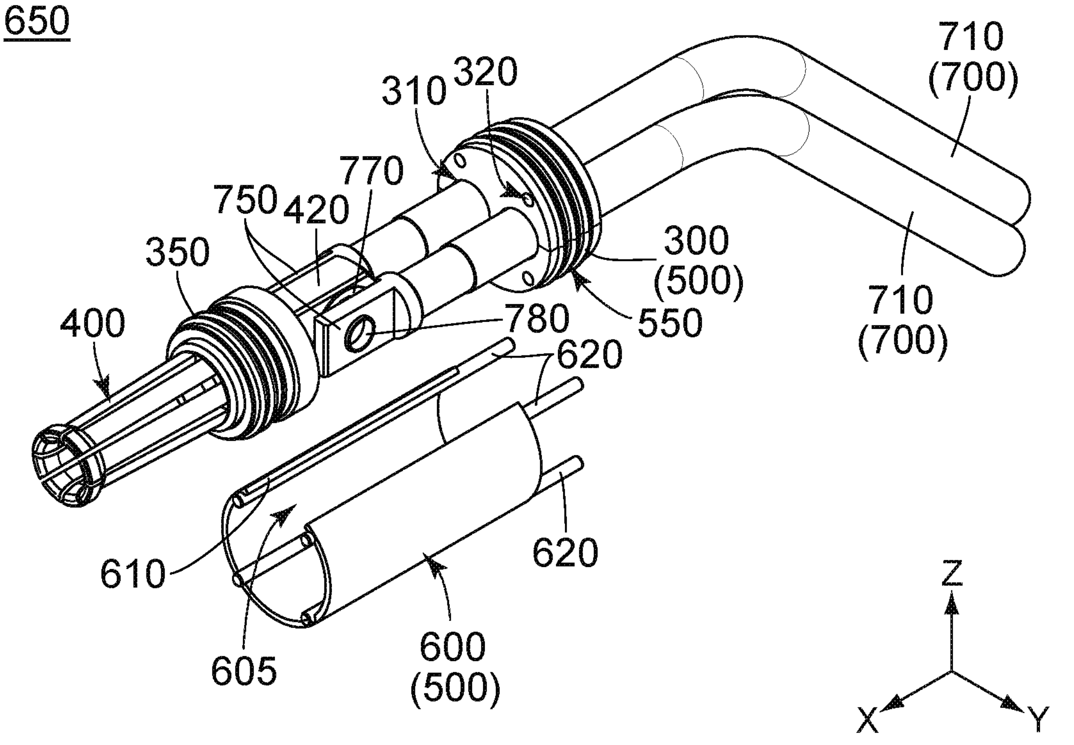
FIG. 16 is an exploded, perspective view showing the assembly element of FIG. 15. In the figure, the sleeve is detached from a connector element while a second coupling portion is connected with first coupling portions.

As shown in FIG. 16, each of the sleeves 600 of the present embodiment extends in the front-rear direction. Each of the sleeves 600 has a substantially C-shaped cross-section in a perpendicular plane perpendicular to the front-rear direction. Each of the sleeves 600 opens upward in the up-down direction. In other words, each of the sleeves 600 has an opening 605 at its upper end in the up-down direction.

Figure 6:
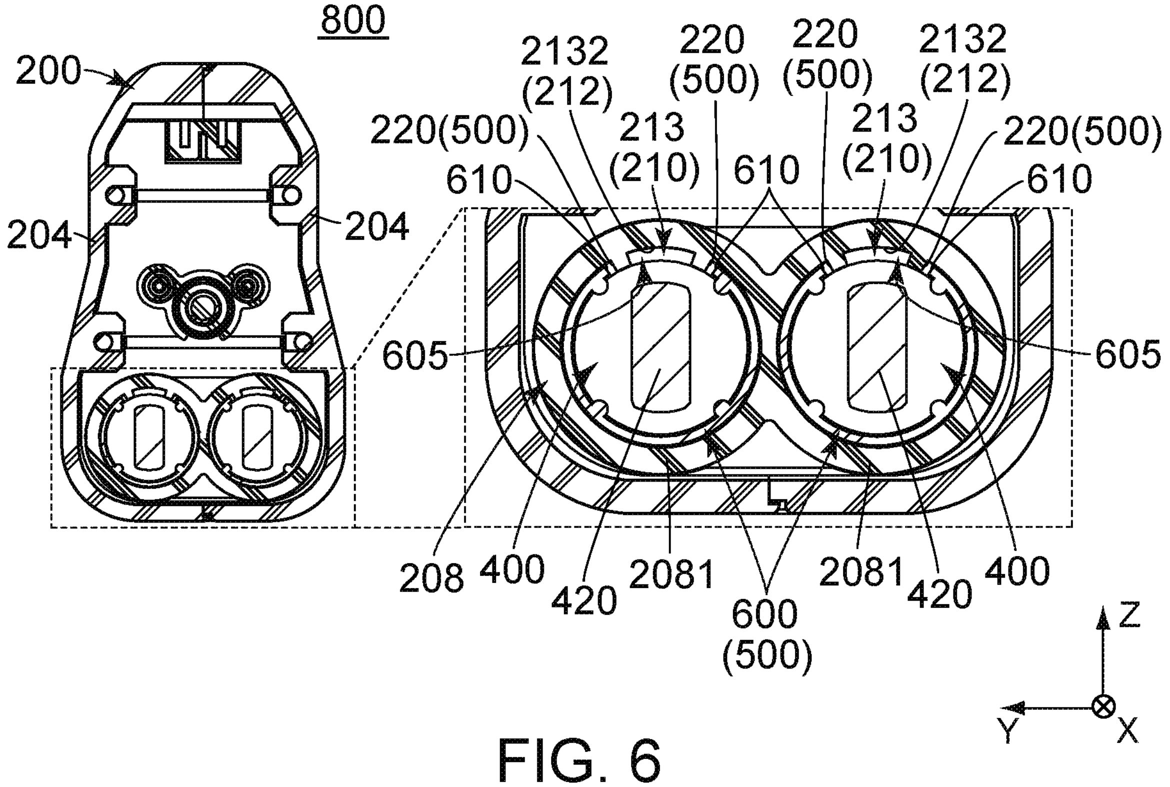
FIG. 6 is a cross-sectional view showing the assembly of FIG. 5, taken along line C-C. In the figure, a part of a connector is illustrated enlarged.
Figure 7:
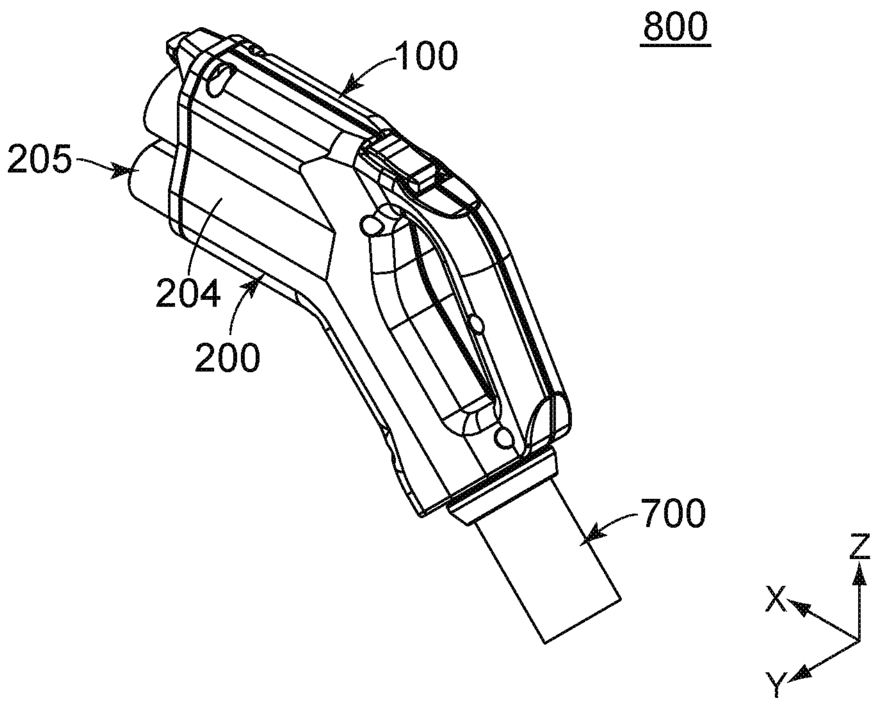
FIG. 7 is a rear, perspective view showing the assembly of FIG. 1.
Figure 8:
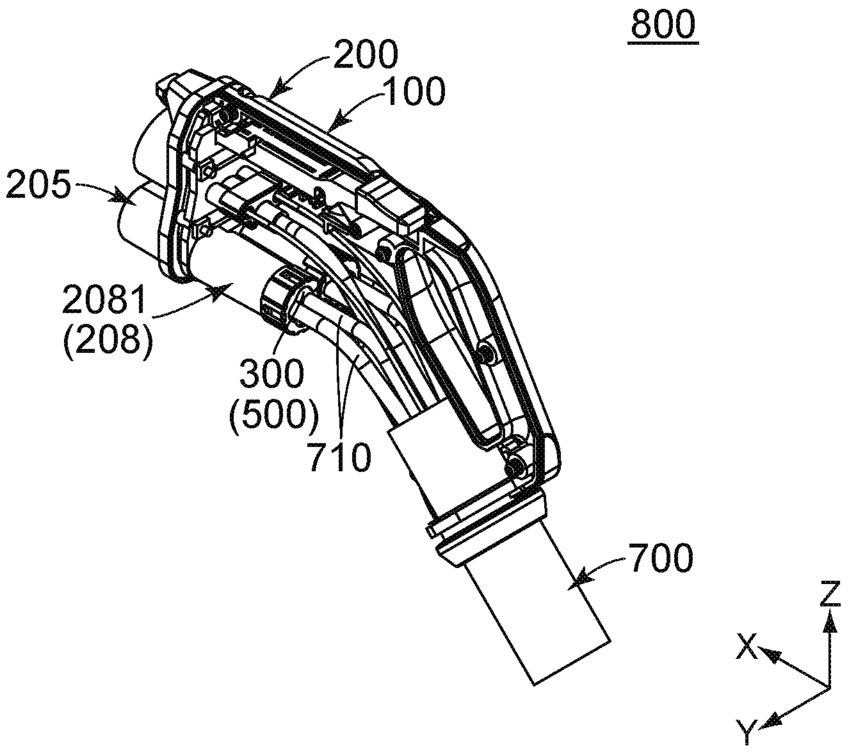
FIG. 8 is a rear, perspective view showing an internal structure of the assembly of FIG. 7. In the figure, one of covers is removed from the connector.
Figure 9:
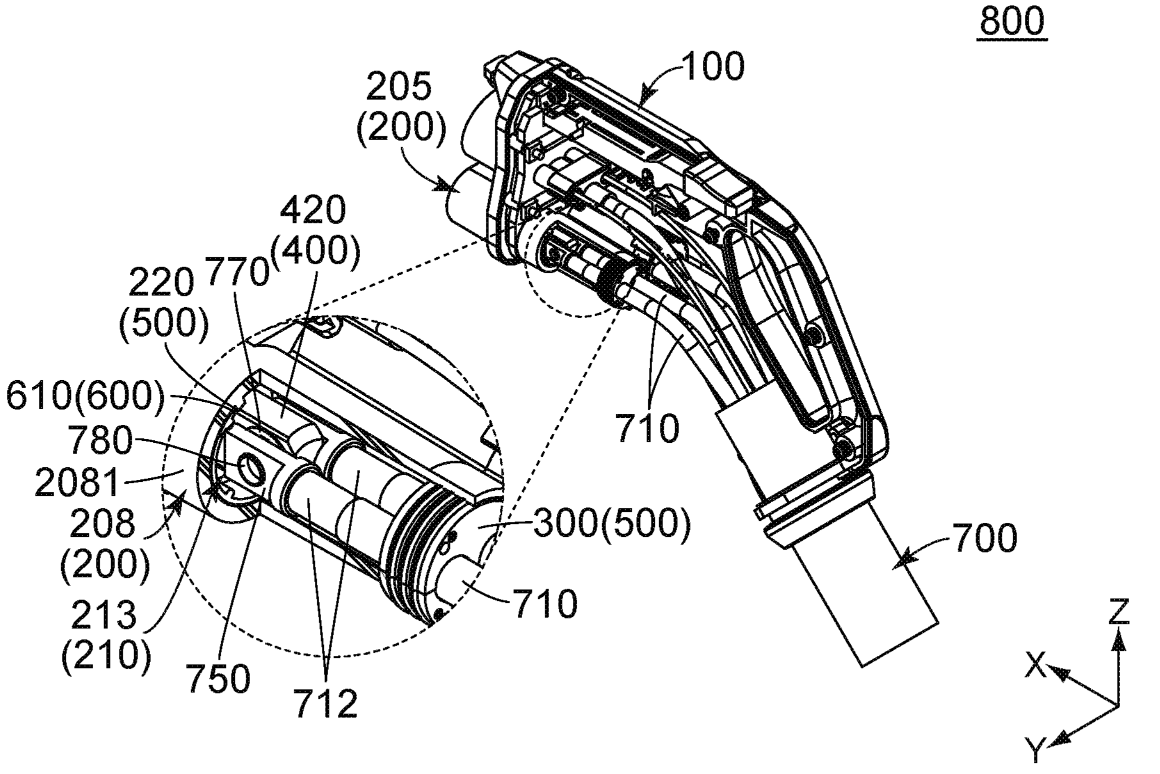
FIG. 9 is a partially cut-away, rear perspective view showing the internal structure of FIG. 8. In the figure, parts of a housing main and a sleeve are cut away, and a part of an assembly element is illustrated enlarged.

Referring to FIG. 6, a set of end portions of the substantially C-shaped cross-section of each of the sleeves 600 functions as a regulated portion 610. In other words, each of the sleeves 600 is provided with the regulated portion 610. The regulating portions 220 correspond to the sleeves 600, respectively. Each of the regulating portions 220 faces the regulated portion 610 of the corresponding sleeve 600 in the perpendicular plane perpendicular to the front-rear direction to regulate a movement of the corresponding sleeve 600 in the perpendicular plane. Specifically, referring to FIGS. 6 and 13, the protruding portions 222 of the regulating portion 220 face the end portions, respectively, of the substantially C-shaped cross-section of the corresponding sleeve 600 in the perpendicular plane to regulate the movement of the corresponding sleeve 600 in the perpendicular plane. Meanwhile, the protruding portions 222 of the regulating portion 220 are positioned in the opening 605 of the corresponding sleeve 600.

As shown in FIG. 4, the sleeves 600 are positioned in the accommodating portions 210, respectively. More specifically, the sleeve 600 is positioned in the first accommodating portion 213. The sleeves 600 correspond to the DC contacts 400, respectively. Each of the sleeves 600 accommodates the second coupling portion 420 of the corresponding DC contact 400 and the first coupling portions 712 which are connected with the second coupling portion 420 of the corresponding DC contact 400. However, the present invention is not limited thereto, but each of the sleeves 600 should, at least in part, accommodate the second coupling portion 420 of the corresponding DC contact 400 and the first coupling portions 712 which are connected with the second coupling portion 420 of the corresponding DC contact 400.

Referring to FIG. 16, each of the sleeves 600 has four holding protrusions 620. The holding protrusion 620 of the present embodiment defines a rear end of the sleeve 600 in the front-rear direction. Each of the holding protrusions 620 extends in the front-rear direction. As understood from FIGS. 15 and 16, the holding protrusions 620 of the sleeve 600 are inserted into the holding holes 320, respectively, of the holding member 300 and are held thereby. In other words, the sleeves 600 are fixed to the holding members 300, respectively.

As shown in FIGS. 4 and 6, a set of the holding member 300, the corresponding sleeve 600 and the corresponding regulating portion 220 functions as a maintaining mechanism 500. In other words, the assembly 800 of the present embodiment further comprises two of the maintaining mechanisms 500. The maintaining mechanisms 500 correspond to the accommodating portions 210, respectively.

As described above, in the assembly 800 of the present embodiment, each of the regulating portions 220 of the housing 200 regulates the movement of the corresponding sleeve 600 in the perpendicular plane, each of the sleeves 600 is fixed to the corresponding holding member 300, and the holding member 300 holds the DC wires 710 each having the first coupling portion 712. Specifically, the parallel arrangement of the first coupling portions 712 of the DC wires 710 in the accommodating portion 210 is maintained by the holding member 300, which holds the DC wires 710, the corresponding sleeve 600 and the corresponding regulating portion 220. In other words, each of the maintaining mechanisms 500 regulates movements of the first coupling portions 712 in the perpendicular plane perpendicular to the front-rear direction to maintain the parallel arrangement of the first coupling portions 712 in the corresponding accommodating portion 210.

As described above, the assembly 800 of the present embodiment comprises the two maintaining mechanisms 500 each of which maintains the parallel arrangement of the first coupling portions 712 in the corresponding accommodating portion 210. Accordingly, even if the connector 100 of the assembly 800 is repeatedly mated with and removed from the mating connector, the arrangement of the first coupling portions 712 in the accommodating portion 210 is prevented from being changed from the parallel arrangement and thereby heat transfer from one of the first coupling portions 712 to a remaining one of the first coupling portions 712 is prevented from being increased in comparison with that at the beginning of use of the assembly 800.

As shown in FIG. 4, the assembly 800 of the present embodiment further comprises two front waterproofing members 350.

Referring to FIG. 17, each of the front waterproofing members 350 is made of insulator such as rubber having elasticity. As shown in FIG. 4, the front waterproofing members 350 are positioned in the accommodating portions 210, respectively. The front waterproofing member 350 is positioned in the first accommodating portion 213. More specifically, the front waterproofing member 350 is positioned at a front end of the first accommodating portion 213 in the front-rear direction. Referring to FIGS. 3 and 4, the front waterproofing member 350 is positioned rearward of the second accommodating portion 214 in the front-rear direction. The front waterproofing member 350 is positioned rearward of the contact portion 410 in the front-rear direction. The front waterproofing member 350 is positioned forward of the second coupling portion 420 in the front-rear direction. The front waterproofing member 350 is positioned forward of the terminal 750 in the front-rear direction. The front waterproofing member 350 is positioned forward of the first coupling portion 712 in the front-rear direction. The front waterproofing member 350 is positioned forward of the DC wire 710 in the front-rear direction. The front waterproofing member 350 is positioned forward of the rear waterproofing member 300 in the front-rear direction. The second coupling portion 420 is positioned between the front waterproofing member 350 and the rear waterproofing member 300 in the front-rear direction. The terminal 750 is positioned between the front waterproofing member 350 and the rear waterproofing member 300 in the front-rear direction. The first coupling portion 712 is positioned between the front waterproofing member 350 and the rear waterproofing member 300 in the front-rear direction. A part of the DC wire 710 is positioned between the front waterproofing member 350 and the rear waterproofing member 300 in the front-rear direction. The sleeve 600 is positioned between the front waterproofing member 350 and the rear waterproofing member 300 in the front-rear direction. The front waterproofing members 350 correspond to the DC contacts 400 and the accommodating portions 210, respectively. Each of the front waterproofing members 350 seals between the corresponding DC contact 400 and the inner wall 212 of the corresponding accommodating portion 210. More specifically, each of the front waterproofing members 350 seals between the corresponding DC contact 400 and the first inner wall 2132 of the first accommodating portion 213 of the corresponding accommodating portion 210. The second coupling portion 420 of each of the DC contacts 400 is connected with the first coupling portions 712 between the corresponding front waterproofing member 350 and the corresponding rear waterproofing member 300.

As described above, each of the rear waterproofing members 300 seals between the DC wire 710 and the inner wall 212 of the corresponding accommodating portion 210, while each of the front waterproofing members 350 seals between the corresponding DC contact 400 and the inner wall 212 of the corresponding accommodating portion 210. In addition, the second coupling portion 420 of each of the DC contacts 400 is connected with the first coupling portions 712 between the corresponding front waterproofing member 350 and the corresponding rear waterproofing member 300 as described above. This prevents water droplets from entering from the outsides of the front waterproofing member 350 and the rear waterproofing member 300 into a space where a connection portion of the second coupling portion 420 and the first coupling portion 712 exists. In other words, the connection portion of the second coupling portion 420 and the first coupling portion 712 is waterproofed.

Referring to FIGS. 4 and 17, the assembly 800 of the present embodiment further comprises four spring washers 770 and two rivets 780.

Referring to FIG. 17, each of the spring washers 770 of the present embodiment is made of metal. As shown in FIG. 16, each of the spring washers 770 is positioned between the terminal 750 and the second coupling portion 420. Specifically, each of the spring washers 770 is positioned between the terminal 750 and the second coupling portion 420 in the horizontal direction. The spring washer 770 is positioned at a position same as a position of the terminal 750 in the up-down direction. The spring washer 770 is positioned at a position same as a position of the terminal 750 in the front-rear direction. The spring washer 770 is positioned at the position same as a position of the second coupling portion 420 in the up-down direction. The spring washer 770 is positioned at the position same as a position of the second coupling portion 420 in the front-rear direction.

As shown in FIG. 4, the spring washer 770 is positioned in the accommodating portion 210. The spring washer 770 is positioned in the first accommodating portion 213. Referring to FIGS. 3 and 4, the spring washer 770 is positioned rearward of the second accommodating portion 214 in the front-rear direction. The spring washer 770 is positioned rearward of the contact portion 410 in the front-rear direction. The spring washer 770 is positioned rearward of the front waterproofing member 350 in the front-rear direction. The spring washer 770 is positioned forward of the first coupling portion 712 in the front-rear direction. The spring washer 770 is positioned forward of the rear waterproofing member 300 in the front-rear direction. The spring washer 770 is positioned between the front waterproofing member 350 and the rear waterproofing member 300 in the front-rear direction.

Referring to FIG. 17, each of the rivets 780 of the present embodiment is made of metal. As shown in FIG. 4, the rivet 780 is positioned in the accommodating portion 210. The rivet 780 is positioned in the first accommodating portion 213. Referring to FIGS. 3 and 4, the rivet 780 is positioned rearward of the second accommodating portion 214 in the front-rear direction. The rivet 780 is positioned rearward of the contact portion 410 in the front-rear direction. The rivet 780 is positioned rearward of the front waterproofing member 350 in the front-rear direction. The rivet 780 is positioned at a position same as a position of the second coupling portion 420 in the front-rear direction. The rivet 780 is positioned forward of the first coupling portion 712 in the front-rear direction. The rivet 780 is positioned at the position same as the position of the terminal 750 in the front-rear direction. The rivet 780 is positioned forward of the rear waterproofing member 300 in the front-rear direction. The rivet 780 is positioned between the front waterproofing member 350 and the rear waterproofing member 300 in the front-rear direction. The rivets 780 correspond to the DC contacts 400, respectively. As understood from FIGS. 16 and 17, each of the rivets 780 is fixed to the corresponding DC contact 400 while passing through the first holes 752 and the second hole 422. The first coupling portions 712 are fixed to the second coupling portion 420 by the rivet 780.

Referring to FIG. 16, a set of the DC contact 400, the front waterproofing member 350, the spring washers 770, the rivet 780, the terminals 750, the rear waterproofing member 300 and the DC wires 710 forms a connector element 550. In other words, the assembly 800 has two of the connector elements 550.

Figure 15:
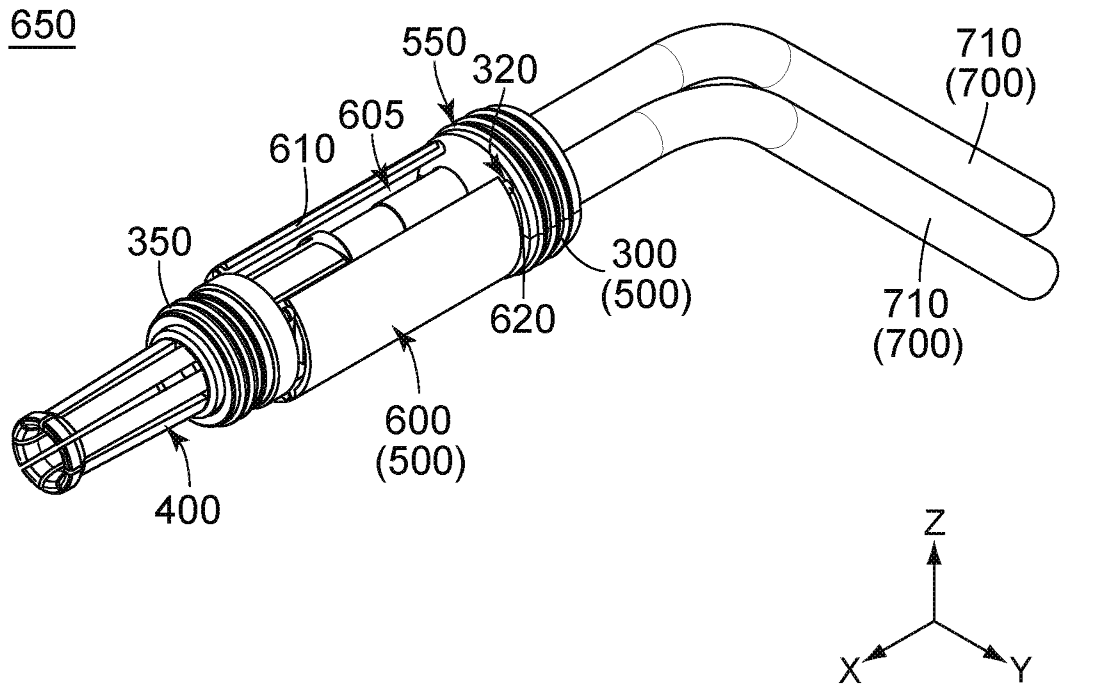
FIG. 15 is a perspective view showing the assembly element which is included in the internal structure of FIG. 9.

Referring to FIG. 15, a set of the connector element 550 and the sleeve 600 forms an assembly element 650. In other words, the assembly 800 has two of the assembly elements 650.

Although the specific explanation about the present invention is made above referring to the embodiments, the present invention is not limited thereto and is susceptible to various modifications and alternative forms.

Although the assembly 800 of the present embodiment is configured so that the first coupling portions 712 are fixed to the second coupling portion 420 by the rivet 780, the present invention is not limited thereto. Specifically, the first coupling portions 712 may be fixed to the second coupling portion 420 by a screw and a nut. In other words, the assembly 800 may have two screws and two nuts instead of the two rivets 780.

In the assembly 800 of the present embodiment, each of the accommodating portions 210 is the hole whose cross-section perpendicular to the front-rear direction is circular, the regulating portion 220 protrudes in the accommodating portion 210 and the regulated portion 610 is the set of the end portions of the substantially C-shaped cross-section of each of the sleeves 600. However, the present invention is not limited thereto. The configuration of the assembly 800 may be modified as follows: the accommodating portion 210 is a hole whose cross-section perpendicular to the front-rear direction is polygonal; the sleeve 600 has a polygonal tubular shape which corresponds to a shape of the accommodating portion 210; a set of corner portions of the polygonal hole of the accommodating portion 210 functions as a regulating portion 220; and a set of corner portions of the polygonal tube of the sleeve 600 functions as a regulated portion 610.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An assembly comprising a cable and a connector, wherein:
the cable includes at least four direct current (DC) wires;
each of the DC wires has a first coupling portion at an end thereof;
the connector is attached to the cable;
the connector is mateable with a mating connector which has mating contacts;
the connector comprises a housing and two DC contacts;
the housing has two accommodating portions;
the two DC contacts are arranged in a horizontal direction;
the DC contacts are accommodated in the accommodating portions, respectively;
each of the DC contacts has a contact portion and a second coupling portion;
the contact portion is positioned forward of the second coupling portion in a front-rear direction perpendicular to the horizontal direction;
when the connector and the mating connector are mated with each other, the contact portions of the DC contacts are brought into contact with the mating contacts, respectively;
the second coupling portion of each of the DC contacts is connected with the first coupling portions of at least two of the DC wires in the corresponding accommodating portion;
the first coupling portions, which are connected with the second coupling portion, are arranged in parallel in the horizontal direction;
the first coupling portions of the at least two DC wires are distinct and separated from each other;
the first coupling portions of the at least two DC wires are connected to each other solely at the second coupling portion; and
in the corresponding accommodating portion, the at least two DC wires are spaced apart from each other in the horizontal direction.

2. The assembly as recited in claim 1, wherein:
the assembly further comprises two maintaining mechanisms;
the maintaining mechanisms correspond to the accommodating portions, respectively; and
each of the maintaining mechanisms regulates movements of the first coupling portions in a perpendicular plane perpendicular to the front-rear direction to maintain the parallel arrangement of the first coupling portions in the corresponding accommodating portion.

3. The assembly as recited in claim 2, wherein:
the assembly further comprises two holding members and two sleeves;
the holding member holds the DC wires;
the sleeves are fixed to the holding members, respectively;
the sleeves are positioned in the accommodating portions, respectively;
the sleeves correspond to the DC contacts, respectively;
each of the sleeves, at least in part, accommodates the second coupling portion of the corresponding DC contact and the first coupling portions which are connected with the second coupling portion of the corresponding DC contact;
each of the sleeves is provided with a regulated portion;
the housing has two regulating portions;
the regulating portions correspond to the sleeves, respectively;
the regulating portions protrude in the accommodating portions, respectively;
each of the regulating portions faces the regulated portion of the corresponding sleeve in the perpendicular plane to regulate a movement of the corresponding sleeve in the perpendicular plane; and
a set of the holding member, the corresponding sleeve and the corresponding regulating portion functions as one of the maintaining mechanisms.

4. The assembly as recited in claim 3, wherein:
the holding members function as rear waterproofing members, respectively;
the rear waterproofing members correspond to the DC contacts and the accommodating portions, respectively;
each of the accommodating portions has an inner wall;
each of the rear waterproofing members seals between the DC wire and the inner wall of the corresponding accommodating portion;
the assembly further comprises two front waterproofing members;
the front waterproofing members correspond to the DC contacts and the accommodating portions, respectively;
each of the front waterproofing members seals between the corresponding DC contact and the inner wall of the corresponding accommodating portion; and
the second coupling portion of each of the DC contacts is connected with the first coupling portions between the corresponding front waterproofing member and the corresponding rear waterproofing member.

5. The assembly as recited in claim 1, wherein:
the second coupling portion of each of the DC contacts is connected with the first coupling portions of two of the DC wires;
the assembly further comprises terminals which are connected with the first coupling portions of the DC wires, respectively; and
each of the second coupling portions is interposed by two of the terminals in the horizontal direction.

6. The assembly as recited in claim 5, wherein:
each of the terminals has a first hole;
the second coupling portion has a second hole;
the assembly further comprises four spring washers and two rivets;
each of the spring washers is positioned between the terminal and the second coupling portion;
the rivets correspond to the DC contacts, respectively; and
each of the rivets is fixed to the corresponding DC contact while passing through the first holes and the second hole.

* * * * *